United States Patent [19]

Smith

[11] Patent Number: 4,726,055
[45] Date of Patent: Feb. 16, 1988

[54] GAS METER WITH REMOTE CONTROL FOR TERMINATING SUPPLY OF GAS AND RELATED METHOD

[76] Inventor: William Smith, 16 Wyoming Ave., Lynbrook, N.Y. 11563

[21] Appl. No.: 673,114

[22] Filed: Nov. 19, 1984

[51] Int. Cl.⁴ .......................................... H04M 11/00
[52] U.S. Cl. ................................ 379/102; 340/825.06; 251/129.04
[58] Field of Search ....................... 340/870.01, 870.02, 340/870.03, 825.06; 251/129.04; 379/102, 107, 104, 105

[56] References Cited

U.S. PATENT DOCUMENTS

| | | | |
|---|---|---|---|
| 1,822,645 | 9/1931 | Crane | 251/129.04 |
| 2,035,358 | 3/1936 | Yates | 379/107 |
| 2,451,989 | 10/1948 | Smith | 251/129.04 |
| 3,377,429 | 4/1968 | Schwartzkapf et al. | 379/71 |
| 3,548,102 | 12/1970 | Schaum et al. | 379/102 |
| 3,922,490 | 11/1975 | Pettis | 379/107 |
| 3,937,890 | 2/1976 | Blethen et al. | 379/107 |
| 4,161,720 | 7/1979 | Bogacki | 340/870.03 |
| 4,406,924 | 9/1983 | Dorey | 340/870.02 |

Primary Examiner—James L. Dwyer
Attorney, Agent, or Firm—Roberts, Spiecens & Cohen

[57] ABSTRACT

A telephone signal or a radio signal is employed to terminate the through flow of gas through a gas meter to enable the flow of gas to a consumer to be terminated from a remote position. In one embodiment, a weighted arm includes a closure member to obturate an opening. The closure member is part of a weighted arm mounted on a rotatable rod bearing a toothed wheel engaged by a pawl which is operated by an electromagnetic arrangement which in turn is controlled by a signal. Provision is made for resetting the arrangement mechanically by the utilization of a key received in the key receiving end of the rotatable rod. In another embodiment, use is made of the fact that the gas meter includes a bellows and rotating arm arrangement. In this embodiment a rod is dropped into a position of interference with the rotating arm thereby to interfere with the flow of gas through the gas meter. In this embodiment resetting is effected by connecting an external power source to an electromagnet within the meter whereby to control the position of the rod which is dropped into interfering position with the rotating arm.

16 Claims, 9 Drawing Figures

GAS METER WITH REMOTE CONTROL FOR TERMINATING SUPPLY OF GAS AND RELATED METHOD

FIELD OF INVENTION

This invention relates to gas meters and more particularly relates to methods and apparatus for terminating the flow of gas through gas meters and thereby interrupting the supply of gas to a consumer by the use of telephone lines or remote control signals.

BACKGROUND

There exists a need for interrupting the supply of gas and other utilities to consumers and to various types of utilization devices. For example, in relationship to multi-apartment dwellings, access may be denied to a company supplying gas to consumers even though the supplier may be desirous of gaining access for terminating the flow of gas through associated gas meters. This desire to terminate the supply of gas may be due to various reasons such as, for example, the fact that a consumer has repeatedly failed to pay for past services and supplies. Heretofore, the only known technique for terminating the supply of gas to such a consumer has been a direct approach to the consumer's gas meter to make an adjustment to prevent the through flow of gas via the meter to the consumer.

There are a number of devices in which a telephone line or a remote control signal is employed to operate one type of device or another. Some of these arrangements are shown in U.S. Pat. Nos. 2,616,972; 3,446,976; 3,742,141; 4,243,973; and 4,267,406. In addition, U.S. Pat. No. 3,922,490 shows the utilization of telephone lines for alarm and utility meter reading purposes. None of these patents show the utilization of telephone lines or remote control signals for purposes of controlling the supply of gas to a consumer.

Ralph McNutt shows in U.S. Pat. No. 2,616,972 an arragement whereby, when a telephone rings, a light energized by a house circuit is immediately turned on, thereby lighting the room to enable a person answering the telephone to readily find the telephone and answer the telephone call.

Clifford Shaw shows in U.S. Pat. No. 3,446,976 a remote volume control apparatus operated by a varying magnetic field produced by the ringing of a telephone to decrease the volume of an audio amplifier during a telephone conversation. The remote volume control is manually reset to restore the volume of the audio amplifier to its original level after the telephone conversation has terminated.

Robert Duncan et al show in U.S. Pat. No. 3,742,141 an electric circuit arrangement whereby an electric circuit is provided for each room of a hotel or the like and is selectively operated from a central control desk to light a lamp assigned to the corresponding room whereby to indicate whether the room is vacant or rented.

David Sandidge shows in U.S. Pat. No. 4,243,973 a coordinating unit which receives an input signal from the ringing circuit of a telephone or the like. The coordinating unit through a program muting circuit reduces the volume of televisions, radios or the like.

James Perry discloses in U.S. Pat. No. 4,267,406 an energy saving apparatus for selectively controlling the heating or cooling equipment in hotels or the like by permitting deactivation of the associated equipment when the room is unoccupied and when the temperature in the room is within a preselected range. Automatic reactivation of the equipment is furthermore provided. The apparatus utilizes portions of a preexisting conventional telephone installation and particularly utilizes the tip and ring lines between a central station and a telephone provided in the room for carrying electric power and signals required for effecting the temperature control.

Charles Pettis discloses in U.S. Pat. No. 3,922,490 a system for utilizing existing telephone subscriber lines for low-level signalling. The arrangement is employed for alarm and utility meter reading systems.

SUMMARY OF INVENTION

It is an object of the invention to employ, for example, radiated and/or telephone signals originating at a remote position for the control of the flow of gas through a gas meter or the like.

It is another object of the invention to provide an improved method for the termination of the supply of gas to gas customers who reside in dwellings or the like to which access may be denied to the supplier of the gas.

In achieving the above and other objects of the invention, there is provided in a general sense and as will be described in greater detail hereinbelow, an apparatus comprising a gas meter, an inlet for supplying gas to the gas meter, an outlet for conveying gas away from said gas meter, an internal meter arrangement for conveying gas from the inlet to the outlet, and a control responsive to a signal originating outside of the meter for interfering with the flow of gas between the inlet and the outlet. The control will, in accordance with the invention, include a device responsive to a telephone signal or to a radiated signal or the like. The control will include an electromagnetic device operated by the signal and will further include a device responsive to the electromagnetic device for interfering with the flow of gas. Preferably the arrangement will also include a reset device coupled to the control for resetting the same to reestablish the flow of gas. The reset device, as will be shown in greater detail hereinbelow, may be a mechanical device or an electromagnetic device.

In accordance with one embodiment of the invention, the control includes a closure located over a connection to the outlet to obturate the same, a suspension to keep the closure member spaced from the connection, and a release to release the suspension thereby to enable the closure to obturate the connection. The suspension may include preferably a rotatable rod, an arm extending generally radially from the rod, a toothed wheel on the rod, a pawl normally in interfering relationship with the toothed wheel, and an electromagnet capable of withdrawing the pawl from this interfering relation. In addition, the rod may be provided with an arrangement to receive a key for resetting the rod arm and closure member to reestablish the flow of gas through the gas meter.

In another embodiment the internal meter arrangement includes a bellows and rotating arm to meter the flow of gas from the inlet to the outlet and the control includes a member to move into interfering position with the rotating arm to impede the flow of gas. The control may include an electromechanical device normally in interfering relationship with the rotating arm but withdrawable in response to the remote control signal to allow the member to move into the aforesaid interfering position. There may also be provided an electromagnet to reset the interfering member to enable reestablishing the flow of gas. A power connection is coupled to the electromagnetic device to enable the supply of power to the same from a power source external to the meter.

In another embodiment, a separate device including a valve to be installed before the meter will respond to either a telephone or radio signal and close by spring loading to interrupt the flow of gas. The spring loaded valve will be controlled by an electromechanical device that will withdraw on signal and allow the valve to close. The control may include a reset feature to allow the valve to be reopened manually.

In the aforesaid, the meter may be located in a multi-family dwelling and will comprise a signal source external to the dwelling to operate the control. In accordance with the invention, there is moreover provided a method which comprises installing in a gas meter an arrangement for interfering with the flow of gas therethrough and adapted for responding to an externally generated signal and controlling this arrangement with an externally generated signal to interfere with the flow of gas selectively. As has been pointed out above, the control may be controlled with a telephone signal or a radiated signal or the like.

Other objects, features and advantages of the invention wil be found in the detailed decription which follows hereinbelow as illustrated in the accompanying drawing.

DETAILED DESCRIPTION

Figure 1:
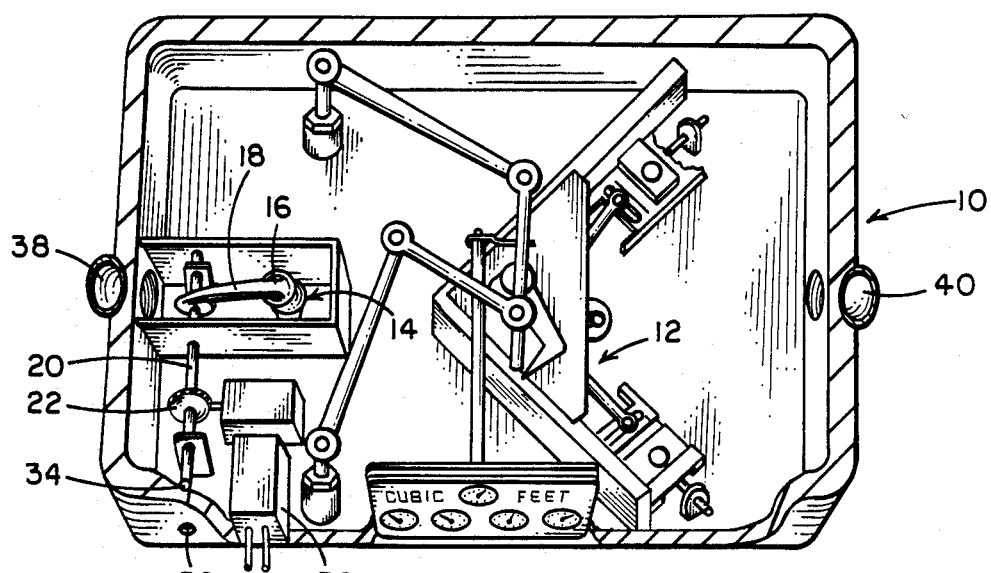
FIG. 1 is a diagrammatic partly pictorial view of the interior of a portion of a gas meterembodying the remote control of the invention.
Figure 2:
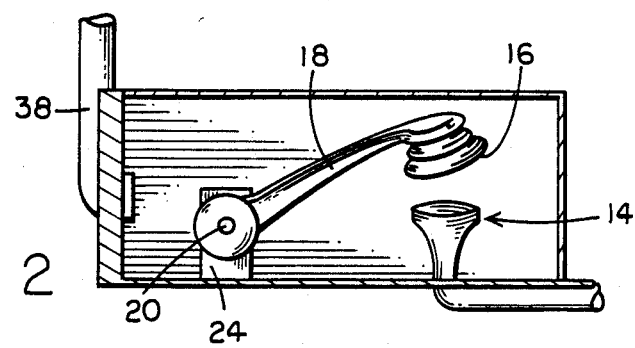
FIG. 2 is a diagrammatic view showing a detail of the arrangement in the apparatus of FIG. 1 for terminating the flow of gas.
Figure 3:
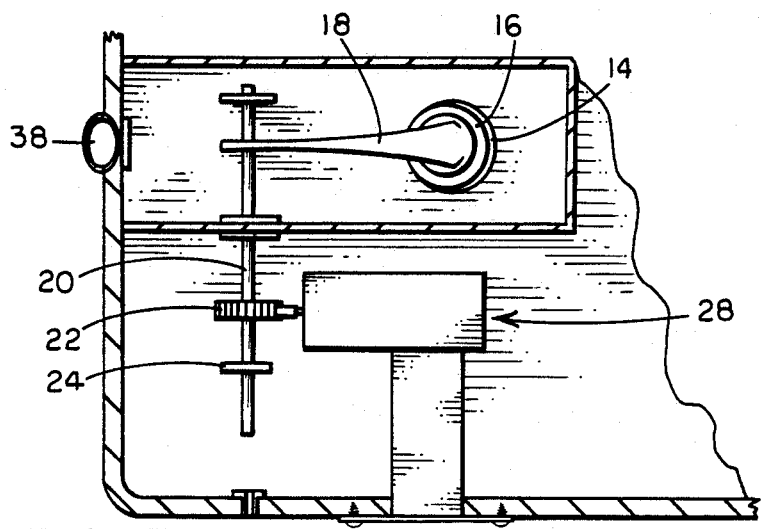
FIG. 3 is a further diagrammatic view of the arrangement for terminating the flow of gas in accordance with the invention.
Figure 4:
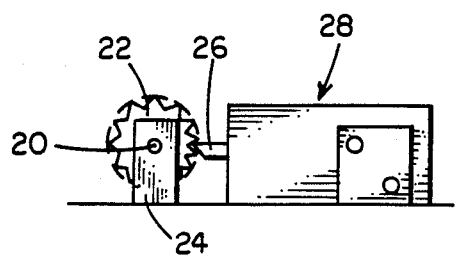
FIG. 4 is a further diagrammatical view of the apparatus of FIG. 3.

Reference is next made to the gas meter (FIGS. 1-4) generally shown at 10. This gas meter is a conventional gas meter through which the flow of natural gas or the like to a consumer takes place.

This flow is metered and measured with the reading of the amount of gas used generally being stored and displayed on dials or the like. Other forms of measurement and display may be employed such as, for example, digital illuminated displays generated in manners which are conventional.

The internal conventional construction of the meter 10 is illustrated generally at 12 and requires no explanation in this text. The arrangement of the invention involves the use of a connecting tubular structure indicated generally at 14. Over this connection is provided a closure member 16 mounted on an arm 18 which is generally radially disposed on a rotating rod 20 on which is mounted a toothed wheel 22. The rod 20 may be supported, at least in part, by a bracket 24.

In its normal condition of operation, a control or holding member 26 is mounted in interfering relationship with the toothed wheel 22. This control member 26 is withdrawn from interfering relationship by an electromagnetic arrangement generally indicated at 28. Therein is a conventional electromagnetic member adapted for being controlled by a signal such as, for example, a telephone signal or a radiated signal. An arrangement such as one of those shown by the abovementioned patents may be employed for this purpose. Furthermore the device may be operated by a radio receiver indicated at 30. This radio receiver has its own power supply and will be capable of receiving one or more control signals originating from a transmitter located remotely of the device such as, for example, outside of a multi-apartment dwelling within which the gas meter may be located and with respect to which access has been denied by the controller or owner of the building.

Figure 5:
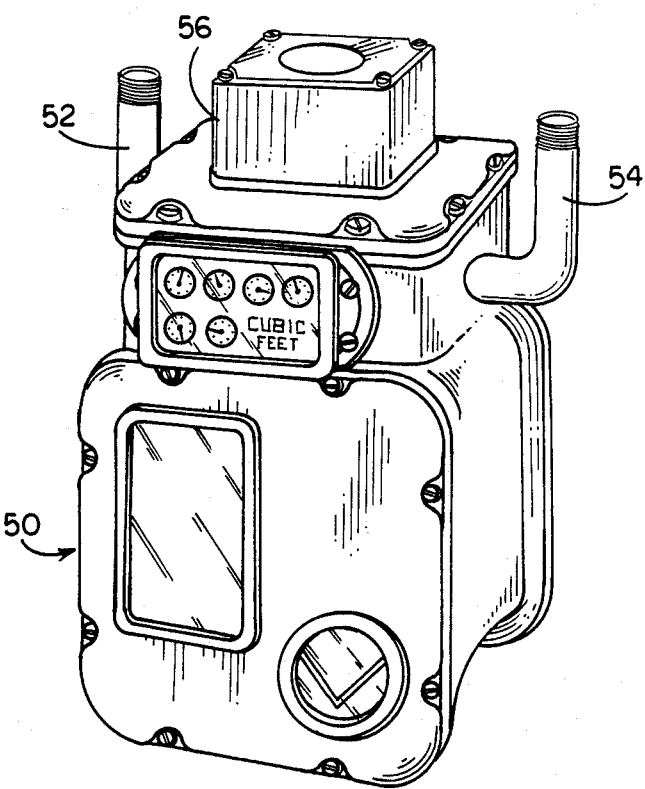
FIG. 5 illustrates a gas meter provided with a remote control arrangement in accordance with the invention.
Figure 6:
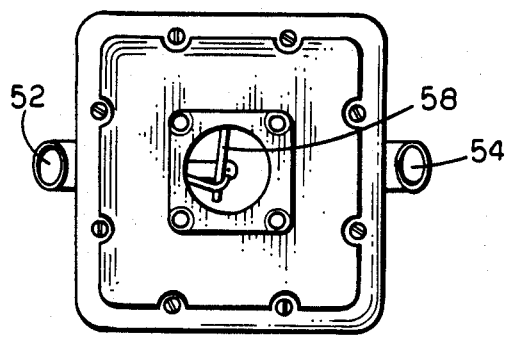
FIG. 6 is a diagrammatic view of the improvement of the apparatus of FIG. 5.
Figure 7:
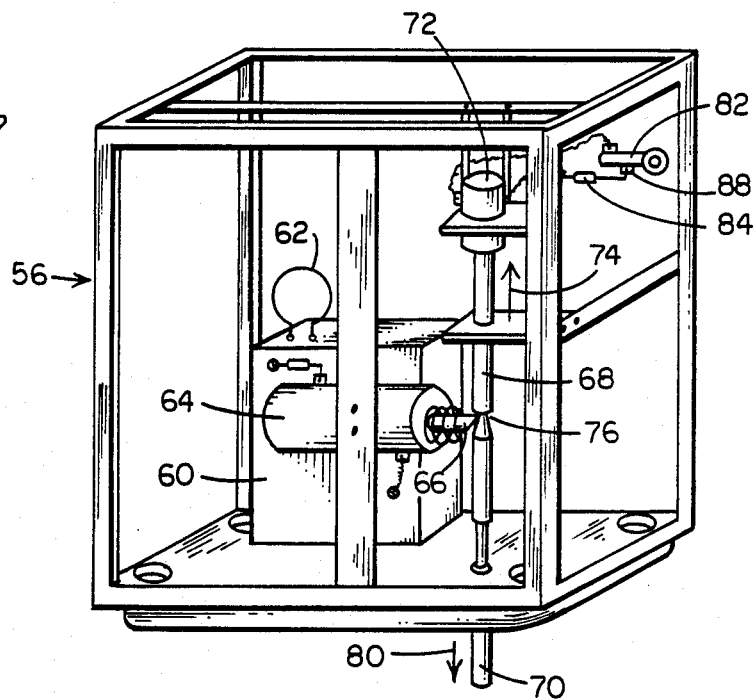
FIG. 7 is a diagrammatic view illustrating the operation of the device of FIGS. 5 and 6.

The arm 18 and the closure member 16 are weighted and displaceable. A key slot may be provided in the end 34 of the rod 20. A key may be inserted through a key opening 36 provided in the housing of the gas meter 10. Insertion of the key into the key slot 34 will enable a rotation of the rod 20 to bring the arm 18 to the position indicated in FIG. 2 with the closure member 16 suspended over the connection 14. When a signal is received to operate the electromagnetic arrangement 28, the pawl 26 is withdrawn from the position illustrated in FIG. 4 and the weight of the arm 18 and closure member 16 will operate to rotate the rod 20 thereby bringing the closure member 16 into obturating relationship with the connection 14. Thereby the flow of gas from the inlet indicated at 38 to the outlet indicated at 40 will be terminated. It will follow that access directly into the building in which the gas meter is accommodated will no longer be necessary as the flow of gas through the gas meter can be terminated from a position remotely located with respect to the gas meter. This will involve the method of controlling the same by a telephone signal, a radiated signal or the like as a result of which a utility may terminate the flow of gas or supply of gas to a consumer without gaining access to its gas meter. Reference is next made to FIGS. 5-7 in which a second embodiment of the invention is illustrated. FIG. 5 illustrates a gas meter 50 having an inlet 52 and an outlet 54. Mounted atop the conventional meter 50 is the housing for a remote control device 56. In this embodiment of the invention, advantage is taken of the fact that the gas meter 50 is conventionally provided with a bellows and rotating arm arrangement such as indicated at 58. The invention functions to provide for dropping an arm into interfering relationship with the rotating arm incorporated in arrangement 58 whereby to interfere with the flow of gas through the meter.

In further accordance with this embodiment of the invention, the improvement 56 is provided with a radio receiver 60, having an antenna 62 adapted for receiving control signals of remote origin. The signals operate an electromagnetic device 64 which withdraws an arm 66 normally in interfering relationship with the rod 68, thereby to enable the bottom of the rod indicated at 70 to drop into interfering relationship with the associated rotating arm conventionally embodied in the gas meter.

In this embodiment of the invention, there is provided a second electromagnetic device 72 capable of lifting the rod 68 in the direction indicated by arrow 74 whereby to elevate the bottom portion 70 of rod 68 out of interfering relationship with the aforesaid rotating arm.

In FIG. 7 it will be seen that the rod 68 is provided with an annular groove 76 or the like within which to accomodate the pawl or interfering member 66. When the pawl 66 is retracted from the groove 76 the rod will drop in the direction indicated by arrow 80 thereby to move into the interfering position or relationship indicated hereinabove. The electromagnet arrangement 72 provides for withdrawing rod 68 from this interfering position as has been noted hereinabove. The electromagnet 72 is operated by power supplied through a socket 82 which provides for resetting the device. Connections to the electromagnet 72 are indicated in the form of resistors 84 and 88. The socket 82 enables the connection of an external power source to the electromagnet 72 thereby to reset the device under the control of the utility or other such supplier of gas.

The method of the invention involves generally installing in association with a conventionally available gas conveyance device such as a gas pipe or a gas meter a means for interfering with the flow of gas therethrough and adapted for responding to an externally generated signal, and controlling this means with an externally generated signal to interfere with the flow of gas selectively.

Figure 8:
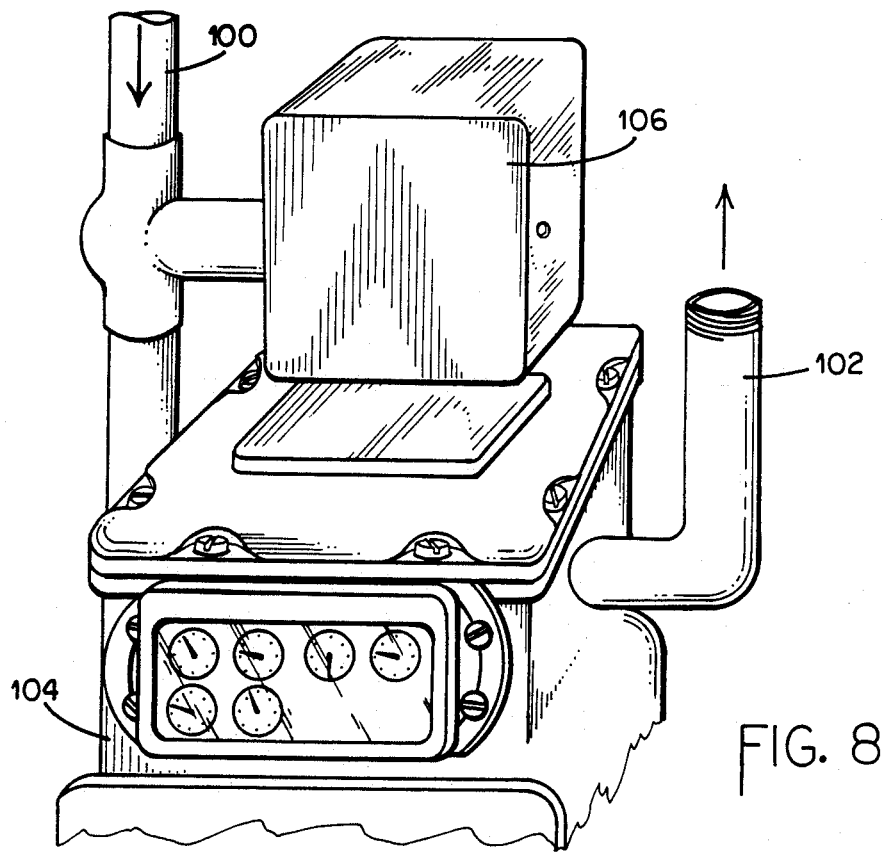
FIG. 8 is a diagrammatic view of a further embodiment of the invention.
Figure 9:
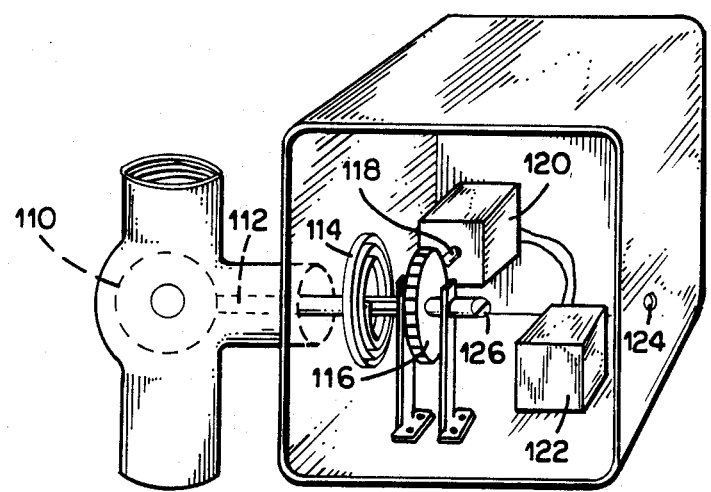
FIG. 9 is a diagrammatic view of the control portion of the embodiment of FIG. 8 with the front cover removed.

FIGS. 8 and 9 show a further embodiment in which a closing off of gas flow is effected in an inlet (or outlet) pipe. In these figures are illustrated an inlet pipe 100, an outlet pipe 102, and a meter 104. A remote control unit operable by radiated or telephone signals or the like is indicated at 106. It is connected into the inlet pipe by a T-connection 108.

Within T-connection 108 is a valve or closure member 110 mounted on rotatable rod 112 spring loaded by spring 114 to a position whereby member 110 permits the flow of gas. Toothed wheel 116 is engaged by pawl 118 to hold rod 112 in the illustrated position. On response to a remote signal such as a radiated signal or a telephone signal, solenoid 120 withdraws the pawl 118 allowing spring 114 to rotate rod 112 thereby driving closure member 110 to closing position. The operating signal is received at circuit 122. Hole 124 and key slot 126 allowable the engagement of a tool with the end of rod 112 to rotate the same and reset closure member 110.

There will now be obvious to those skilled in the art many mdodifications and variations of the embodiments referred to hereinabove. These modifications and variations will not depart from the scope of the invention if defined by the following claims or equivalent thereto.

What is claimed is:

1. Apparatus comprising a gas meter, inlet pipe means for supplying gas to said gas meter, outlet pipe means for conveying gas away from said gas meter, internal meter means for converying gas from said inlet means to said outlet means, and control means responsive to a signal originating outside of said meter for interfering with the flow of gas through at least one of the first three said means, said control means including displaceable means having a first position of non-interference with any of the first three said means and a second position for interfering with the flow of gas through at least one of the first three said means, said control means further including holding means to hold said displaceable means in said first position and being responsive to said signal for releasing the displaceable means to said second position; said apparatus further including reset means separate from said control means coupled to said displaceable means for resetting the same to reestablish the flow of gas.

2. Apparatus as claimed in claim 1 wherein said control means includes means responsive to a telephone signal.

3. Apparatus as claimed in claim 1 wherein said holding means is responsive to a radiated signal for releasing said displaceable means.

4. Apparatus as claimed in claim 1 wherein said holding means includes electromagnetic means operated by said signal.

5. Apparatus as claimed in claim 1 wherein the reset means is a mechanical means.

6. Apparatus as claimed in claim 1 wherein the reset means is an electromagnetic means.

7. Apparatus as claimed in claim 1 wherein said meter is located in a multi-family dwelling, comprising a signal a source external to said dwelling to operate said control means.

8. Apparatus comprising a gas meter, inlet pipe means for supplying gas to said gas meter, outlet pipe means for conveying gas away from said gas meter, internal meter means for conveying gas away from said inlet means to said outlet means, and control means responsive to a signal originating outside of said meter for interfering with the flow of gas through at least one of the first three said means, said control means including displaceable means having a first position of non-interference with any of the first three said means and a second position for interfering with the flow of gas through at least one of the first three said means, said control means further including holding means to hold said displaceable means in said first position and being responsive to said signal for releasing the displaceable means to said second position, said control means including a conduit connection to said outlet means, a closure member located over said connection to said outlet means to obturate the same, suspension means to keep said member spaced from said connection, and release means to release said suspension means to enable said closure means to obturate said connection, said suspension means including a rotatable rod, an arm extending generally radially from said rod, a toothed wheel on said rod, a pawl normally in interfering relation with said toothed wheel and electromagnetic means to withdraw said pawl from said interfering relation.

9. Apparatus as claimed in claim 8 comprising means on said rod to receive a key for resetting the rod, arm and closure member to open said connection.

10. Apparatus comprising a gas meter, inlet pipe means for supplying gas to said gas meter, outlet pipe means for conveying gas away from said gas meter, internal meter means for conveying gas from said inlet means to said outlet means, and control means responsive to a signal originating outside of said meter for interfering with the flow of gas through at least one of the first three said means, said control means including displaceable means having a first position of non-interference with any of the first three said means and a second position for interfering with the flow of gas through at least one of the first three said means, said control means further including holding means to hold said displaceable means in said first position and being responsive to said signal for releasing the displaceable means to said second position, said internal meter means including a bellows and rotating means to meter the flow of gas from the inlet means to the outlet means and said control means including a member to move into interfering position with the rotating means to impede the flow of gas.

11. Apparatus as claimed in claim 10 wherein said control means includes electromechanical means normally in interfering relation with said member but withdrawable in response to said signal to allow the member to move into said interfering position.

12. Apparatus as claimed in claim 11 comprising electomagnetic means to reset said member to enable the flow of gas.

13. Apparatus as claimed in claim 12 comprising a power connection coupled to the second said electromechanical means to enable the supply of power to the same from a power source external to said meter.

14. Apparatus comprising a gas meter, inlet pipe means for supplying gas to said gas meter, outlet pipe means for conveying gas away from said gas meter, internal meter means for conveying gas from said inlet means to said outlet means, and control means responsive to a signal originating outside of said meter for interfering with the flow of gas through at least one of the first three said means, said control means including displaceable means having a first position of non-interference with any of the first three said means and a second position for interfering with the flow of gas through at least one of the first three said means; said control means further including holding means to hold said displaceable means in said first position and being responsive to said signal for releasing the displaceable means to said second position; said control means including a closure means in one of the pipe means and displaceable to close off said one pipe means; and a spring loaded means cooperative with said closure means such that the closure means is urged to close off said one pipe means.

15. Apparatus as claimed in claim 14 comprising further means to prevent the spring-loaded means from causing the closure means to close off said one pipe means, said further means being responsive to said signal to enable to closure means to close off said one pipe means.

16. Apparatus as claimed in claim 14 comprising reset means to reset said closure means.

* * * * *